United States Patent [19]
Iga et al.

[11] Patent Number: 5,764,828
[45] Date of Patent: Jun. 9, 1998

[54] OPTICAL APPARATUS FOR CONTROLLING ANGLE OF DIVERGENCE OF RING BEAM

[75] Inventors: Kenichi Iga; Shinichi Katsura, both of Machida; Yuzo Kawaguchi, Yokohama, all of Japan

[73] Assignee: Kawaguchi Kogaku Sangyo, Japan

[21] Appl. No.: 727,416

[22] PCT Filed: Jun. 4, 1996

[86] PCT No.: PCT/JP96/01505

§ 371 Date: Oct. 18, 1996

§ 102(e) Date: Oct. 18, 1996

[87] PCT Pub. No.: WO96/42031

PCT Pub. Date: Dec. 27, 1996

[30] Foreign Application Priority Data

Jun. 9, 1995 [JP] Japan ............................ 7-167124
May 13, 1996 [JP] Japan ............................ 8-141211

[51] Int. Cl.$^6$ ............................................ G02B 6/34
[52] U.S. Cl. ............................ 385/36; 385/31; 385/33; 385/39
[58] Field of Search ............................ 385/15, 24, 31, 385/33, 36, 38, 39

[56] References Cited

U.S. PATENT DOCUMENTS 4,834,484 5/1989 Gorman et al. .................. 385/33 X
4,961,622 10/1990 Gorman et al. .................. 385/33
5,113,244 5/1992 Curran .............................. 385/24

FOREIGN PATENT DOCUMENTS 63-157123 6/1988 Japan.
2-222918 9/1990 Japan.
6-95027 4/1994 Japan.

*Primary Examiner*—John D. Lee
*Attorney, Agent, or Firm*—Pollock, Vande Sande & Priddy

[57] ABSTRACT

An optical apparatus for controlling an angle of divergence of a ring beam which is capable of irradiating a ringed light beam having a uniform distribution of light intensity with an arbitrary angle of divergence with respect to the optical axis in the direction of 360° concurrently. The optical apparatus comprises parallel beam generating means (2) to which a light beam (L1) output from a light source (1) is input and which outputs the incident light (L2) by transforming it into a parallel light beam (L3); ring beam generating means (3) to which the parallel beam (L3) output from the parallel beam generating means (2) is input and which outputs the input light (L4) by transforming it into a ringed light beam (L5) whose shape is annular when irradiated to an imaginary plane perpendicular to an optical axis (A—A); and divergent angle changing means (4) for changing an angle of divergence (θ3) (an angle formed between the optical axis (A—A) and the direction of propagation of the ring beam (L5)).

8 Claims, 10 Drawing Sheets

OPTICAL APPARATUS FOR CONTROLLING ANGLE OF DIVERGENCE OF RING BEAM

TECHNICAL FIELD OF THE INVENTION

The present invention relates to an optical apparatus and an apparatus capable of outputting a ringed light beam having a uniform distribution of light intensity and more particularly to an optical apparatus for controlling an angle of divergence of a ringed light beam which is capable of irradiating a narrow light beam (slit beam) whose distribution of light intensity is uniform in the direction of 360° concurrently with any angle of divergence with respect to an optical axis.

BACKGROUND ART

Hitherto, as an optical apparatus for irradiating a slit beam in the direction of 360°, there has been known an apparatus which transforms a laser beam output from a laser source into a ringed beam by inputting it to and reflecting from or transmitting through a conical prism or the like having a conical light reflecting surface or a conical light transmitting surface.

Further, among levels used in construction and civil engineering works, there has been known one which scans a laser beam in the direction of 360° by turning an optical element such as a prism for reflecting or transmitting the laser beam to change an irradiating direction thereof by means of a turning mechanism such as a motor.

However, the inventors et al. have clarified that it is extremely difficult to obtain a ringed beam having a uniform distribution of intensity in the direction of 360° with the above-mentioned technology using the conical prism and the like just by transforming the beam output from a semiconductor laser or the like into the ringed beam via the conical prism or the like because the beam has an anisotropy that its distribution of sectional intensity is different in the vertical and horizontal directions. It has been also clarified that the prior art technology has had a problem that it is difficult to obtain a uniform slit beam due to a diffraction of light input to an apex portion of the conical prism or the like.

The technology of turning the prism or the like also has had a problem that because the irradiating direction of the laser beam is scanned, the laser beam cannot be received at two or more points in the same time and the precision of leveling carried out by means of the level by receiving the laser beam at a plurality of points cannot be so high. It has had also other problems that the measuring accuracy drops due to aged deterioration of the turning mechanism and that it requires a power source for supplying driving force to the motor or the like.

Accordingly, it is an object of the present invention to solve the aforementioned problems by providing an optical apparatus for controlling an angle of divergence of a ring beam which is capable of outputting the ring beam having a uniform distribution of light intensity.

SUMMARY OF THE INVENTION

An optical apparatus for controlling an angle of divergence of a ring beam of the present invention described in claim 1 comprises parallel beam generating means which is capable of outputting a parallel light beam; ring beam generating means to which the parallel beam output from the parallel beam generating means is input and which is capable of outputting the input light beam by transforming into a ringed light beam whose shape is annular or partly annular when it is irradiated to an imaginary plane vertical to an optical axis and which diverges with a predetermined angle of divergence with respect to the optical axis; and divergent angle changing means for changing the angle of divergence so that an expansion ratio or reduction ratio of the irradiated shape of the ring beam output from the ring beam generating means with respect to a distance from an output end face changes on the way.

By constructing as described above, the ring beam having a uniform distribution of intensity can be irradiated with an arbitrary angle of divergence with respect to the optical axis in accordance to its use.

That is, the present invention is characterized in that it contains expansion ratio changing means for changing the expansion ratio of the irradiated shape of the ring beam to control the angle of divergence of the irradiated shape in a wide scope.

The optical apparatus for controlling an angle of divergence of a ring beam described in claim 2 is arranged such that, in the invention described in claim 1, the ring beam generating means is formed of a step index optical fiber to give a flexibility and to make the ring beam generating means readily available.

The optical apparatus for controlling an angle of divergence of a ring beam described in claim 3 is arranged such that, in the invention described in claim 2, the step index optical fiber is set to a length that causes the incident light to reflect three times or more within the optical fiber to output the ring beam having a uniform distribution of intensity from the optical fiber. Here, the more the number of times of reflection of the incident light, the better the uniformity of the distribution of intensity of the ring beam is, so that it is not always necessary to set an upper limit of the number of times of reflection.

The optical apparatus for controlling an angle of divergence of a ring beam described in claim 4 is arranged such that, in the invention described in claim 2, the step index optical fiber is set to a length that causes the incident light to reflect preferably more than 3.9 times and less than 10.8 times within the optical fiber to be able to create an apparatus for emitting the practically enough uniform ring beam in a practically compact size when the present invention is applied to, for example, a level used in construction and civil engineering works, to an optical demultiplexer or an optical multiplexer used in optical communications or to various sensors such as a burglar alarm sensor.

The optical apparatus for controlling an angle of divergence of a ring beam described in claim 5 is arranged such that, in the invention described in claim 2, an input end face of the step index optical fiber to which the parallel light beam is input is inclined such that a normal line of the input end face and the optical axis of the parallel beam form an angle of about 10° to 20° to input the parallel beam aslant to the optical fiber to cause an adequate number of times of reflection within the optical fiber.

The optical apparatus for controlling an angle of divergence of a ring beam described in claim 6 is arranged such that, in the invention described in claim 1, the ring beam generating means is formed of a transparent cylindrical rod to increase a diameter of the output end face for outputting the ring beam more than the core diameter of the step index optical fiber to increase an output diameter of the ring beam output from the rod and to allow the narrower beam to reach to a distant place.

The optical apparatus for controlling an angle of divergence of a ring beam described in claim 7 is arranged such that, in the invention described in claim 6, the cylindrical rod is set to a length that causes the incident light to reflect more than four times within the rod to output the ring beam having a uniform distribution of intensity from the rod. Here, the more the number of times of reflection of the incident light, the better the uniformity of the distribution of intensity of the ring beam is, so that it is not always necessary to set an upper limit of the number of times of reflection.

The optical apparatus for controlling an angle of divergence of a ring beam described in claim 8 is arranged such that, in the invention described in claim 6, the cylindrical rod is set to a length that causes the incident light to reflect preferably more than 4.2 times and less than 7.6 times within the rod to be able to create an apparatus for emitting the practically enough uniform ring beam in a practically compact size when the present invention is applied to, for example, a level used in construction and civil engineering works, to an optical demultiplexer or an optical multiplexer used in optical communications or to various sensors such as a burglar alarm sensor.

The optical apparatus for controlling an angle of divergence of a ring beam described in claim 9 is arranged such that, in the invention described in claim 6, an input end face of the cylindrical rod to which the parallel beam is input is inclined such that a normal line of the input end face and the optical axis of the parallel beam form an angle of about 30° to 45° to input the parallel beam aslant to the rod to cause an adequate number of times of reflection within the rod.

The optical apparatus for controlling an angle of divergence of a ring beam described in claim 10 is arranged such that, in the invention described in claim 6, a diameter of the cylindrical rod is about 4 mm to 6 mm to increase an output diameter of the ring beam output from the rod and to allow the narrower beam to reach to a distant place.

The optical apparatus for controlling an angle of divergence of a ring beam described in claim 11 is arranged such that, in the invention described in claim 1, the divergent angle changing means has a conical reflecting surface capable of reflecting light or a conical transmitting surface capable of transmitting light and is arranged so that the ring beam output from the ring beam generating means is input to the conical reflecting surface or the conical transmitting surface avoiding an apex portion of the conical reflecting surface or of the conical transmitting surface.

Thereby, an effect of diffraction of the incident light caused by the apex portion of the divergent angle changing means may be eliminated.

The optical apparatus for controlling an angle of divergence of a ring beam described in claim 12 is arranged such that, in the invention described in claim 11, a degree of an apex angle of the conical reflecting surface or of the conical transmitting surface is what permits the ring beam input to the divergent angle changing means to diverge in the direction vertical to the optical axis centering on the optical axis of the ringed input light beam to be able to output the narrow beam vertically to the optical axis and in the direction of 360° concurrently.

Thereby, no turning mechanism which has been used in the prior art needs to be provided, eliminating an effect of shakiness of the turning mechanism and the like caused by aged deterioration.

Further, because an irradiated light may be measured concurrently by providing light receivers at a plurality of measuring points, respectively, when the irradiated light needs to be measured at a plurality of points like a level used in construction and civil engineering works, the measurement may be performed in higher precision.

The optical apparatus for controlling an angle of divergence of a ring beam described in claim 13 is arranged such that, in the invention described in claim 1, a laser source for emitting laser light is used as the light source. The present invention enables the ringed output beam to receive no effect of the nonuniform distribution of light intensity of the laser beam even if the laser source is used.

BEST MODES FOR CARRYING OUT THE INVENTION

Figure 1:
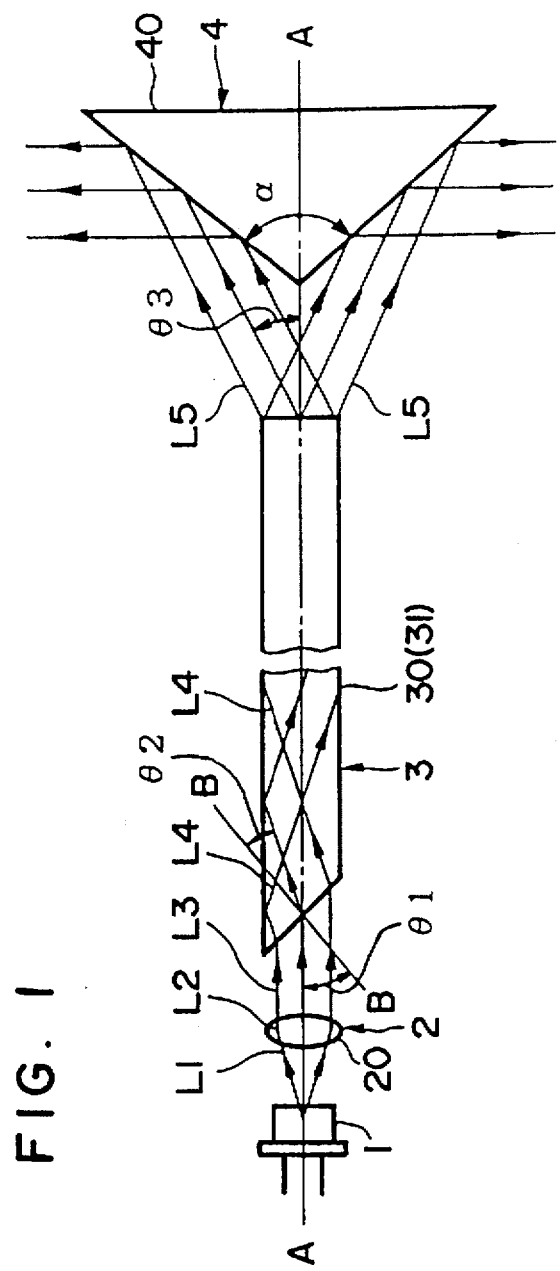
FIG. 1 is a diagrammatic view showing a first embodiment of an optical system and optical paths in the optical system in an optical apparatus of the present invention.

Best modes of an optical apparatus for controlling an angle of divergence of a ring beam (hereinafter referred to simply also as an optical apparatus) of the present invention will be explained below with reference to FIGS. 1 through 14. It is noted that the same reference numerals refer to the same parts throughout the several views.

FIG. 1 is a diagrammatic view showing a first embodiment of an optical system and optical paths in the optical system in the inventive optical apparatus.

The optical apparatus comprises parallel beam generating means 2 to which light L1 output from a light source 1 is input and which outputs the incident light L2 by transforming into a parallel beam L3, ring beam generating means 3 to which the parallel beam L3 output from the parallel beam generating means 2 is input and which outputs the incident light L4 by transforming into a ring beam L5 whose shape is annular when irradiated to an imaginary plane (not shown) vertical to an optical axis A—A, and divergent angle changing means 4 for changing an angle of divergence (an angle formed between the optical axis A—A and a direction of propagation of the ring beam L5) θ3 of the ring beam L5 output from the ring beam generating means 3 on the way. The optical axis is aligned so that a coupling efficiency of the light source 1, the parallel beam generating means 2, the ring beam generating means 3 and the divergent angle changing means 4 is enhanced as much as possible.

The light source 1 may be a source of various lasers such as a semiconductor laser, solid state laser, gas laser, dye laser, excimer laser and free electron laser, an LED (light emitting diode) or a light source of other monochromatic lights.

The parallel beam generating means 2 described above may be a collimator lens 20 for example for transforming the light L1 output so as to diverge from the light source 1 into the parallel beam L3.

The ring beam generating means 3 described above is an optical element formed of an optical fiber, i.e. a step index optical fiber in particular (hereinafter referred to simply as an optical fiber) 30, or a transparent cylindrical rod 31.

An end face (input end face) of the optical fiber 30 or the cylindrical rod 31 on the side where the parallel beam L3 output from the collimator lens 20 enters is formed aslant with respect to the optical axis A—A. An end face (output end face) of the optical fiber 30 or the cylindrical rod 31 on the side where the ring beam L5 is output is formed vertically to the optical axis A—A. Because the input end face of the optical fiber 30 or the cylindrical rod 31 is formed thus aslant, the light L4 input to the optical fiber 30 or the cylindrical rod 31 propagates toward the output end face while reflecting several times therein. Thereby, the incident light L4 is mixed in the spiral direction and is output from the output end face as the ring beam L5. The ring beam L5 at this time becomes a slit beam having a narrow irradiation width.

A relationship expressed by Fresnel's formula holds between an incident angle θ1 when light enters the optical fiber 30 or the cylindrical rod 31 (i.e. an angle formed between a normal line B—B of the input end face of the optical fiber 30 or the cylindrical rod 31 and the optical axis A—A) and an angle of refraction θ2 as follows:

$$\sin \theta 1 = n \sin \theta 2 \qquad (1)$$

where n is a refractive index of the optical fiber 30 or the cylindrical rod 31. Further, a relationship expressed by the following equation holds between the divergent angle θ3 of the ring beam L5 and the incident angle θ1:

$$n \sin (\theta 1 - \theta 2) = \sin \theta 3 \qquad (2)$$

Accordingly, from the above equations (1) and (2), the divergent angle θ3 of the ring beam L5 is decided by an inclination (equal to the incident angle θ1) of the input end face of the optical fiber 30 or the cylindrical rod 31 and the refractive index. That is, the inclination of the input end face of the optical fiber 30 or the cylindrical rod 31 may be decided corresponding to the divergent angle θ3 of the ring beam L5.

In concrete, when the optical fiber 30 is used as the ring beam generating means 3, a fiber whose core diameter is 0.5 mm or 1.0 mm, for example, may be used. The optical fiber 30 is set to have a length that causes the incident light L4 to reflect within the optical fiber 30 three times or more, preferably 3.9 times to 10.8 times. The inclination of the input end face of the optical fiber 30 is preferred to be about 10° to 20°, though it depends on the refractive index of the core. The reason thereof is based on experiments which the inventors et al. have conducted by using an optical system shown in FIG. 6. The contents of the experiments will be described later.

When the cylindrical rod 31 is used as the ring beam generating means 3, a rod whose diameter is about 4 to 6 mm, for example, may be used, though it is not confined only to that size. The cylindrical rod 31 is set to have a length that causes the incident light L4 to reflect within the cylindrical rod 31 four times or more, preferably 4.2 times to 7.6 times. The inclination of the input end face of the cylindrical rod 31 is preferred to be about 30° to 45°, though it depends on the refractive index of the core. The reason thereof is based on the experiments which the inventors et al. have conducted by using the optical system shown in FIG. 6. The contents of the experiments will be described later.

The divergent angle changing means 4 described above is a conical prism 40 for example whose outer surface is a conical reflecting surface which can reflect light. The conical prism 40 is disposed so that its apex portion (apex) faces to the optical fiber 30 or the cylindrical rod 31 and is not hit by the ring beam L5 output from the optical fiber 30 or the cylindrical rod 31. For example, the conical prism 40 is disposed so that the apex portion thereof coincides just with a center point of a sectional shape (ring) of the ring beam L5 (it is an imaginary point and is not shown). The conical prism 40 is also disposed so that an axis (not shown) which passes through the apex overlaps with the optical axis A—A. The same effect with changing the divergent angle θ3 of the ring beam L5 can be obtained by reflecting the ring beam L5 by the conical prism 40. In the example in FIG. 1, the ring beam L5 output from the optical fiber 30 or the cylindrical rod 31 is diverged in the direction vertical to the optical axis A—A by the conical reflecting surface of the conical prism 40, though the present invention is not confined to such a case. Thereby, the slit beam may be output vertically to the optical axis A—A and in the direction of 360° concurrently. A degree of the apex angle α of the conical prism 40 at this time is [90°+θ3].

Figure 2:
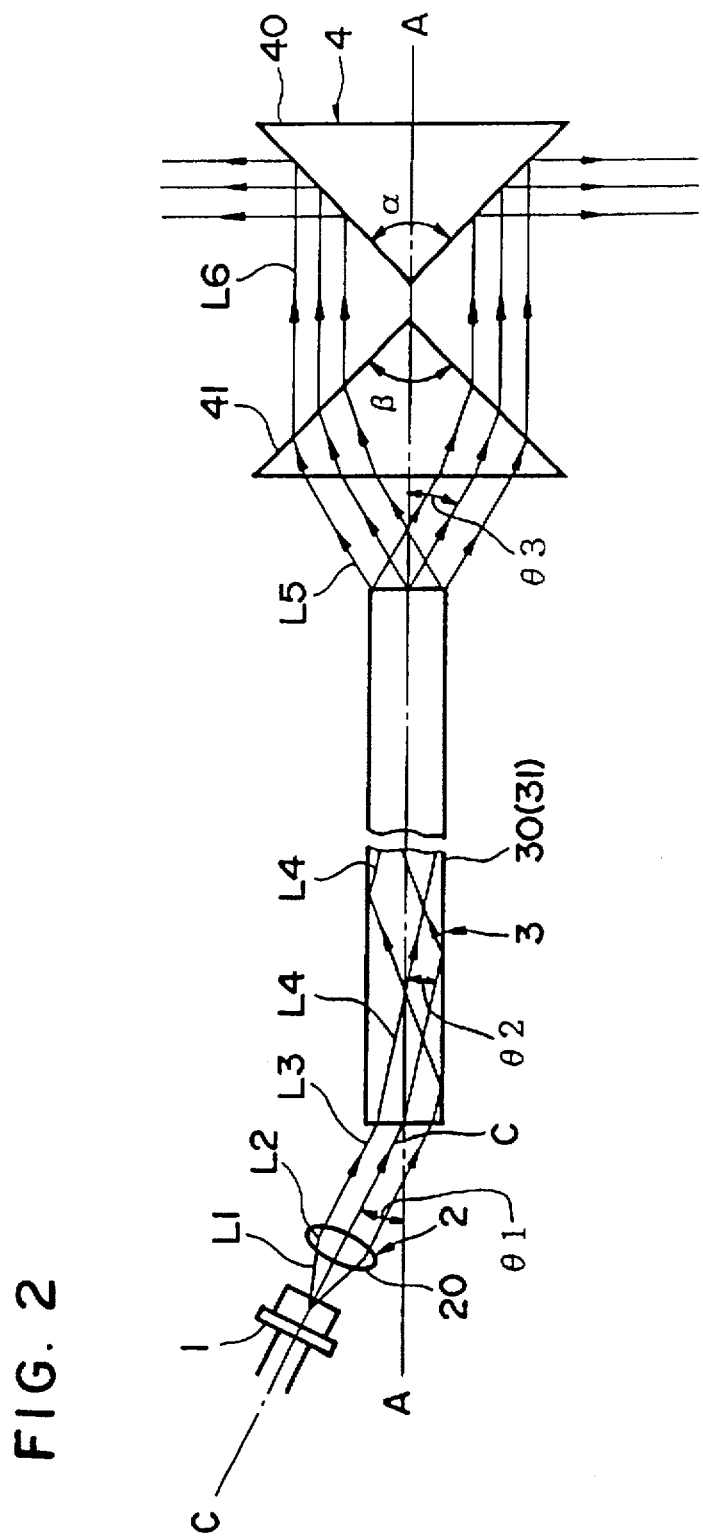
FIG. 2 is a diagrammatic view showing a second embodiment of an optical system and optical paths in the optical system in the optical apparatus of the present invention.

FIG. 2 is a diagrammatic view showing a second embodiment of an optical system and optical paths in the optical system in the optical apparatus of the present invention.

The optical apparatus of the second embodiment is different from the first embodiment described above in the following two points. The first point is that an input end face of the optical fiber 30 or the cylindrical rod 31 is vertical to the optical axis A—A, not aslant, and the parallel beam L3 output from the collimator lens 20 is input aslant to that plane. The second point is that another conical prism 41 is disposed between the optical fiber 30 or the cylindrical rod 31 and the conical prism 40 such that they oppose each other, i.e. such that the apex portions of the conical prisms 40 and 41 face to each other. The conical prism 41 is disposed so that an axis which passes through its apex overlaps with the optical axis A—A. It is noted that the arrangement other than that is the same with the first embodiment, so that its explanation is omitted here.

The light source 1 and the collimator lens 20 are disposed on an optical axis C—C which forms an angle of θ1 with respect to the optical axis A—A. Accordingly, an angle of incidence of the parallel beam L3 to the input end face of the optical fiber 30 or the cylindrical rod 31 is θ1. In the second embodiment, a divergent angle θ3 of the ring beam L5 output from the optical fiber 30 or the cylindrical rod 31 becomes equal to the angle of incidence θ1.

The conical prism 41 transmits and transforms the ring beam L5 output with the divergent angle θ3 into a ringed parallel beam L6. Accordingly, differing from the first embodiment described above, the ringed parallel beam L6 is reflected by the reflecting surface of the conical prism 40. A degree of the apex angle α of the conical prism 40 at this time is 90°. A degree of the apex angle β of the conical prism 41 is appropriately selected so that the parallel beam L6 is output.

Figure 3:
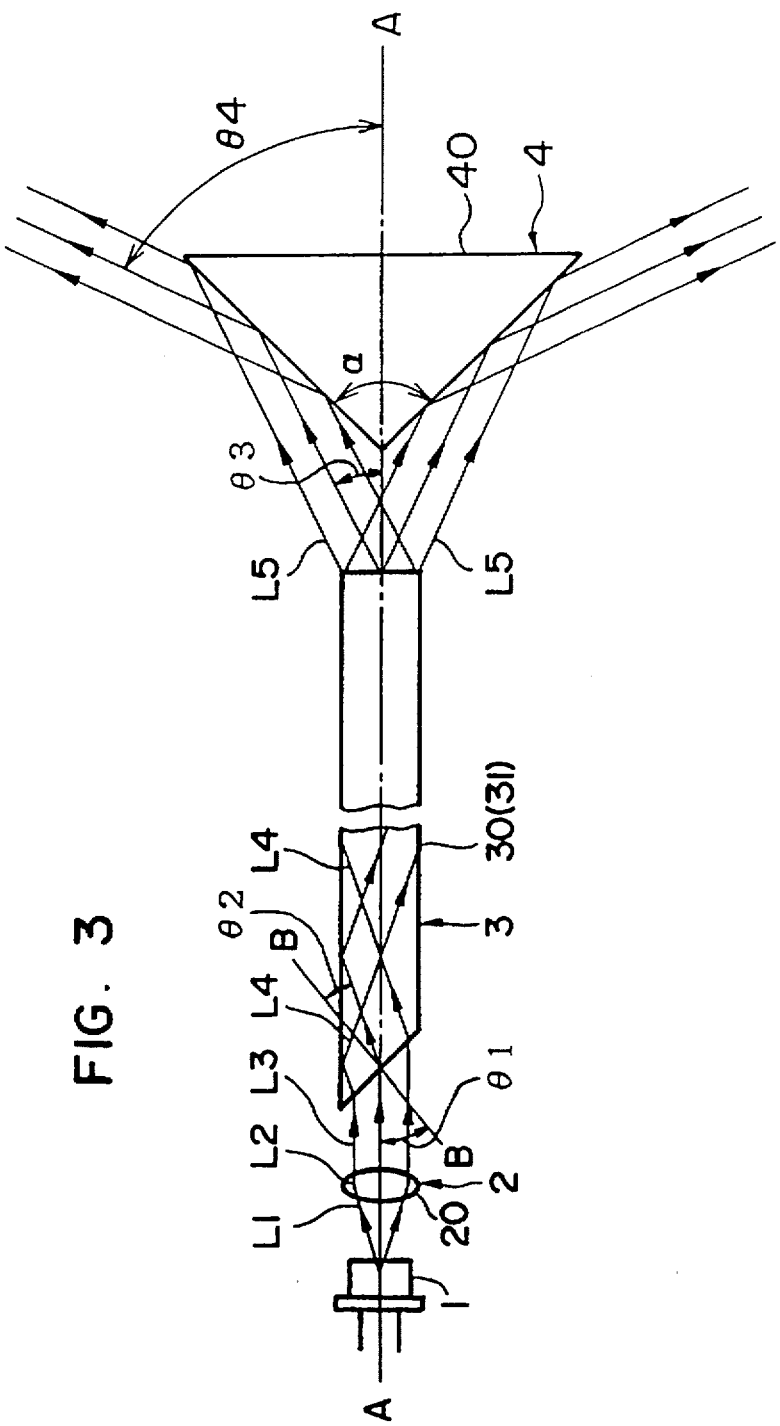
FIG. 3 is a diagrammatic view showing a third embodiment of an optical system and optical paths in the optical system in the optical apparatus of the present invention.

FIG. 3 is a diagrammatic view showing a third embodiment of an optical system and optical paths in the optical system in the optical apparatus of the present invention.

The optical apparatus of the third embodiment is different from the first embodiment in that a conical prism 40 whose apex angle α is smaller than the apex angle ([90°+θ3]) of the prism in the first embodiment is used as the divergent angle changing means 4. It is noted that because the arrangement other than that is the same with that of the first embodiment, its explanation will be omitted here.

The divergent angle θ3 of the ring beam L5 may be changed to a divergent angle θ4 which is larger than θ3 and smaller than 90° by reflecting the ring beam L5 by the reflecting surface of the outer periphery of the conical prism 40 used in the third embodiment. That is, the ring beam L5 output from the optical fiber 30 or the cylindrical rod 31 advances along the optical axis A—A so as to diverge with the divergent angle θ3 with respect to the optical axis A—A and then advances along the optical axis A—A so as to diverge with the divergent angle θ4 with respect to the optical axis A—A by the conical prism 40. A ringed slit beam which advances along the optical axis A—A with an arbitrary divergent angle θ4 may be obtained by adequately selecting the degree of the apex angle α of the conical prism 40. It is noted that although one conical prism 40 has been used in the third embodiment, two or more conical prisms may be used in combination. Thereby, the angle of divergence with respect to the optical axis A—A may be changed through a plurality of stages.

Figure 4:
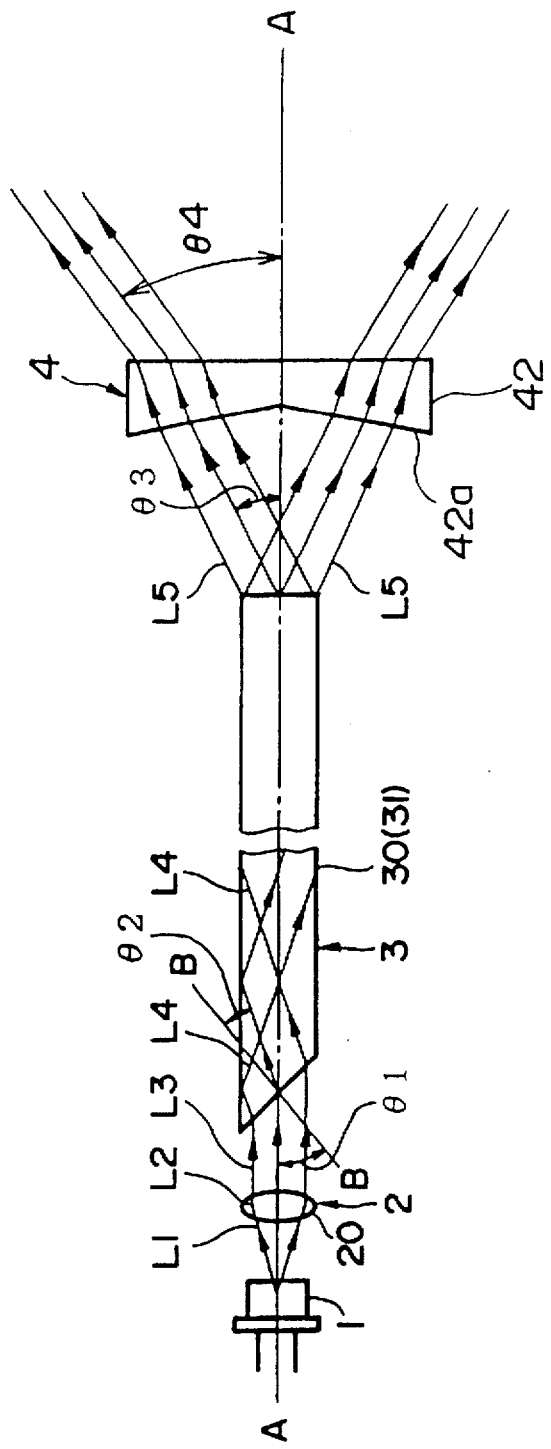
FIG. 4 is a diagrammatic view showing a fourth embodiment of an optical system and optical paths in the optical system in the optical apparatus of the present invention.

FIG. 4 is a diagrammatic view showing a fourth embodiment of an optical system and optical paths in the optical system in the optical apparatus of the present invention.

The optical apparatus of the fourth embodiment is different from the first embodiment in that a prism 42 whose end face to which the ring beam L5 is input is formed in a concave shape is used as the divergent angle changing means 4 to change the angle of divergence of the ring beam L5 which transmits through the prism 42 from θ3 to θ4 (<90°) which is larger than that. It is noted that because the arrangement other than that is the same with that of the first embodiment, its explanation will be omitted here.

The concave face (input end face of the ring beam L5) 42a of the prism 42 is formed so that it uniformly and gradually recedes from the periphery thereof toward the center point of the concave face 42a. That is, the concave face 42a is formed such that it just abuts with an outer peripheral face formed by a generatrix of an imaginary circular cone (not shown) which has a complementary shape thereof. Accordingly, hereinafter, a prism having such a concave face will be referred to as a concave conical prism in the present specification (it is noted that a circular cone shall mean a typical convex circular cone unless otherwise described as "a concave circular cone"). A center point of the concave face 42a of the concave conical prism 42 is a point which corresponds to an apex of the imaginary circular cone and is positioned on the optical axis A—A. The concave conical prism 42 is disposed so that an axis (not shown) of the imaginary circular cone overlaps with the optical axis A—A.

The ring beam L5 output from the optical fiber 30 or the cylindrical rod 31 advances along the optical axis A—A so as to diverge with the divergent angle θ3 with respect to the optical axis A—A and then advances along the optical axis A—A so as to diverge with the divergent angle θ4 with respect to the optical axis A—A as it transmits through the concave conical prism 42. A ringed slit beam which advances along the optical axis A—A with an arbitrary divergent angle θ4 may be obtained by adequately selecting a degree of the inclination of the concave face 42a of the concave conical prism 42, i.e. a degree of the apex angle of the imaginary circular cone which has a complementary shape of the concave conical prism 42. It is noted that although one concave conical prism 42 has been used in the fourth embodiment, two or more concave conical prisms may be used in combination or one concave conical prism 42 and one or more conical prisms may be used in combination. Thereby, the angle of divergence with respect to the optical axis A—A may be changed through a plurality of stages.

Figure 5:
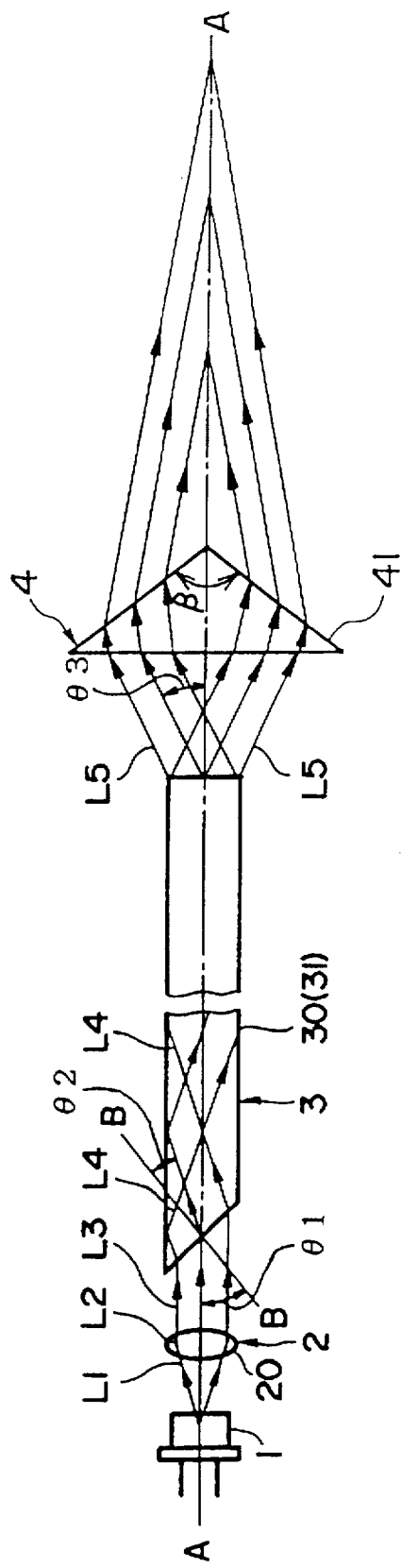
FIG. 5 is a diagrammatic view showing a fifth embodiment of an optical system and optical paths in the optical system in the optical apparatus of the present invention.

FIG. 5 is a diagrammatic view showing a fifth embodiment of an optical system and optical paths in the optical system in the optical apparatus of the present invention.

The optical apparatus of the fifth embodiment is different from the first embodiment in that a prism 41 which has been used in the second embodiment (however, an apex angle β is larger than that of the second embodiment) is used as the divergent angle changing means 4 to change the angle of divergence of the ring beam L5 which transmits through the prism 41 with respect to the optical axis A—A so that a radius of the ring beam L5 is reduced gradually as it advances along the optical axis A—A. It is noted that because the arrangement other than that is the same with that of the first embodiment, its explanation will be omitted here.

The prism 41 is disposed so that an apex portion thereof faces to the side opposite from the output end face of the optical fiber 30 or the cylindrical rod 31. It is also disposed so that an axis (not shown) which passes through the apex overlaps with the optical axis A—A. A ringed slit beam which advances along the optical axis A—A such that it is narrowed with an arbitrary angle may be obtained by adequately selecting the degree of the apex angle β of the conical prism 41. It is noted that although one conical prism 41 has been used in the fifth embodiment, two or more conical prisms may be used in combination or one conical prism 41 and one or more concave conical prisms may be used in combination. Thereby, the angle of divergence with respect to the optical axis A—A may be changed through a plurality of stages.

As it is apparent from each embodiment described above, the conical prisms 40 and 41 and the concave conical prism 42 which constitute the divergent angle changing means 4 perform the functions of converging or diverging the ring beam and may be thus called as a conical lens.

Figure 6:
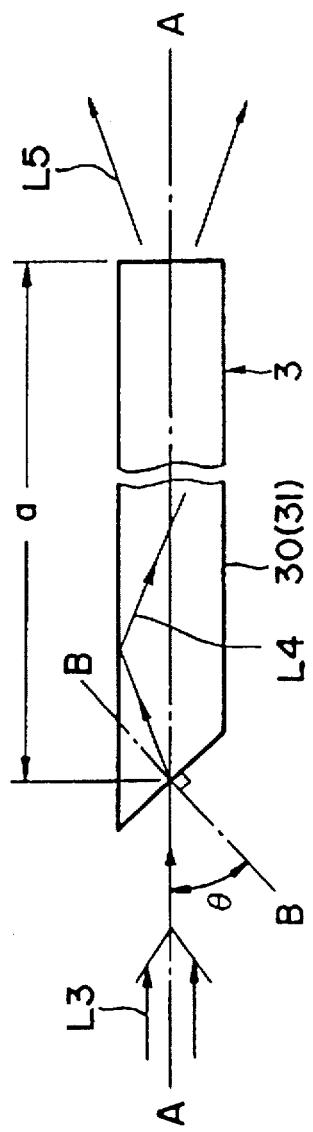
FIG. 6 is a diagrammatic view showing an optical system used in experiments carried out by the inventors et al.

The contents of the experiments which the inventors et. al have conducted in deciding specifications of the optical fiber 30 and the cylindrical rod 31 will be explained below. FIG. 6 shows an optical system used therein. L3 is a parallel light beam which is transformed from laser light output from a semiconductor laser not shown by a collimator lens or the like. This parallel beam L3 was a beam whose section is elliptical (length of major axis: 4.2 mm, length of minor axis: 1.2 mm). A red semiconductor laser of 635 nm of wavelength was used as the light source. The step index optical fiber 30 whose core diameter was 0.5 mm or 1.0 mm and the cylindrical rods 31 made out of quartz whose refractive index to light of 635 nm of wavelength was 1.47 were used. A diameter of the cylindrical rods 31 were 4 mm and 6 mm, respectively.

The number of times of reflection of the incident light L4 within the optical fiber 30 or the cylindrical rod 31 was changed by changing a length a mm and the inclination θ of the input end face of the optical fiber 30 or the cylindrical rod 31 to observe the uniformity of the distribution of intensity of the ring beam L5 output therefrom. Table 1 shows experimental results of the case when the optical fiber 30 having 0.5 mm of core diameter was used, Table 2 shows experimental results of the case when the optical fiber 30 having 1.0 mm of core diameter was used, Table 3 shows experimental results of the case when the cylindrical rod 31 having 4 mm of diameter was used, and Table 4 shows experimental results of the case when the cylindrical rod 31 having 6 mm of diameter was used, respectively.

TABLE 1 core diameter: 0.5 mm

| Incident Angle θ | Length a (mm) | | |
|---|---|---|---|
|  | 15 | 30 | 45 |
| 5° | X | X | X |
|  | (1.3) | (2.2) | (3.0) |
| 10° | X | Δ | O |
|  | (2.1) | (3.9) | (5.6) |
| 20° | Δ | O | O |
|  | (3.9) | (7.4) | (10.8) |

TABLE 2 core diameter: 1.0 mm

| Incident Angle θ | Length a (mm) | | | |
|---|---|---|---|---|
|  | 15 | 30 | 45 | 60 |
| 5° | X | X | X | X |
|  | (0.9) | (1.3) | (1.8) | (2.2) |
| 10° | X | X | X | Δ |
|  | (1.3) | (2.2) | (3.0) | (4.8) |
| 20° | X | Δ | O | O |
|  | (2.2) | (3.9) | (5.6) | (7.4) |

TABLE 3 rod diameter: 4 mm

| Incident Angle θ | Length a (mm) | | |
|---|---|---|---|
|  | 60 | 85 | 100 |
| 20° | X | X | X |
|  | (2.2) | (2.9) | (3.3) |
| 30° | X | Δ | Δ |
|  | (3.1) | (4.2) | (4.9) |
| 45° | Δ | O | O |
|  | (4.7) | (6.5) | (7.6) |

TABLE 4 rod diameter: 6 mm

| Incident Angle θ | Length a (mm) | | |
|---|---|---|---|
|  | 60 | 85 | 100 |
| 20° | X | X | X |
|  | (1.6) | (2.1) | (2.4) |
| 30° | X | X | X |
|  | (2.2) | (3.0) | (3.4) |
| 45° | X | Δ | O |
|  | (3.3) | (4.5) | (5.2) |

In each of those tables, those marked with 'O' had no nonuniformity in the direction of 360° and had a uniform distribution of intensity, those marked with 'Δ' had almost no nonuniformity in the direction of 360° but varied significantly depending on the alignment of the optical axis and those marked with 'X' missed a part in the direction of 360°. Those marked with 'O' and 'Δ' had a distribution of light intensity which is fully and practically uniform. Each numerical value in the parenthesis in the tables indicates a number of times of reflection (R) of the incident light L4 and was given from the following equation (3):

$$R=1+[a-D \tan \theta/2-D/2 \tan \{\theta-\arcsin(\sin \theta/n)\}]\times\tan \{\theta-\arcsin(\sin \theta/n)\}/D \quad (3)$$

Where, D is the diameter of the optical fiber 30 or the cylindrical rod 31, a is the length of the optical fiber 30 or the cylindrical rod 31, θ is the incident angle and n is the refractive index.

It can be seen from Tables 1 and 2 that appropriate optical fibers 30 are those having the core diameter of 0.5 mm to 1.0 mm, the length which causes the incident light L4 to reflect three times or more, preferably 3.9 times to 10.8 times, and the inclination of the input end face of about 10° to 20°. It can be also seen from Tables 3 and 4 that appropriate cylindrical rods 31 are those having the diameter of about 4 mm to 6 mm, the length which causes the incident light L4 to reflect four times or more, preferably 4.2 times to 7.6 times, and the inclination of the input end face of about 30° to 45°.

Next, preferable exemplary applications of the inventive optical apparatus will be explained.

Figure 7:
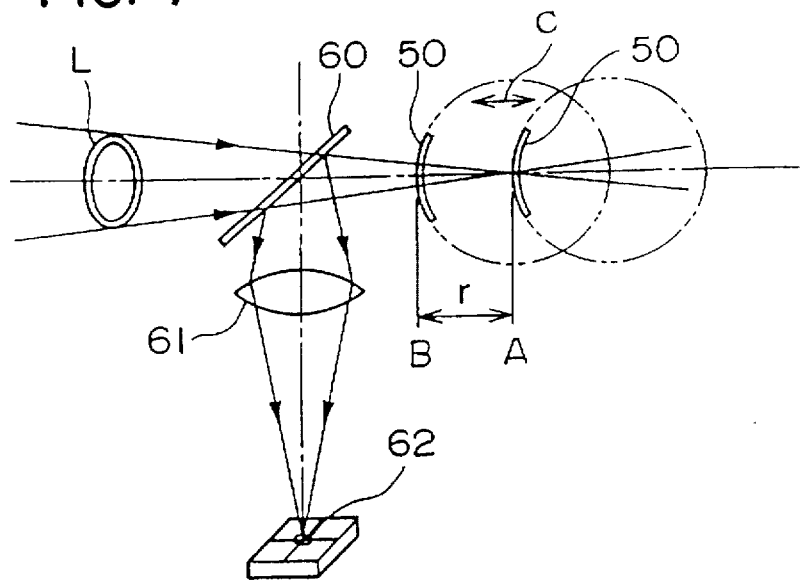
FIG. 7 is a diagrammatic view showing an example in which the inventive optical apparatus is applied to a curvature measuring instrument.

FIG. 7 shows an example in which the inventive optical apparatus is applied to a light emitter of an instrument for measuring a curvature of a curved surface of an object. For the emitter, the optical apparatus which is capable of outputting the ring beam such that its radius is reduced gradually as shown in FIG. 5 for example is used. This curvature measuring instrument is arranged such that a ring beam L output from the emitter (not shown) is applied to a curved surface of an object to be measured 50 and a beam reflected by the curved surface is input to a condenser lens 61 via a splitter plate 60 to condense and to receive it by a light receiver 62. When the object to be measured 50 is moved back and forth as indicated by an arrow C while irradiating the ring beam L, point-like received light images may be obtained on the light receiver 62, respectively, when the surface of the object 50 comes to the position of a convergent point where the ring beam L converges to a point on the optical axis (position of the surface at this time is indicated as point A) and when the center of the curvature of the surface comes to that position (position of the surface at this time is indicated as point B). Received light images other than them are annular. Accordingly, the radius of curvature r may be given from a distance between the points A and B. This curvature measuring instrument allows a curvature of an optical lens, contact lens, eyeball, ball bearing or the like to be measured simply.

Figure 8:
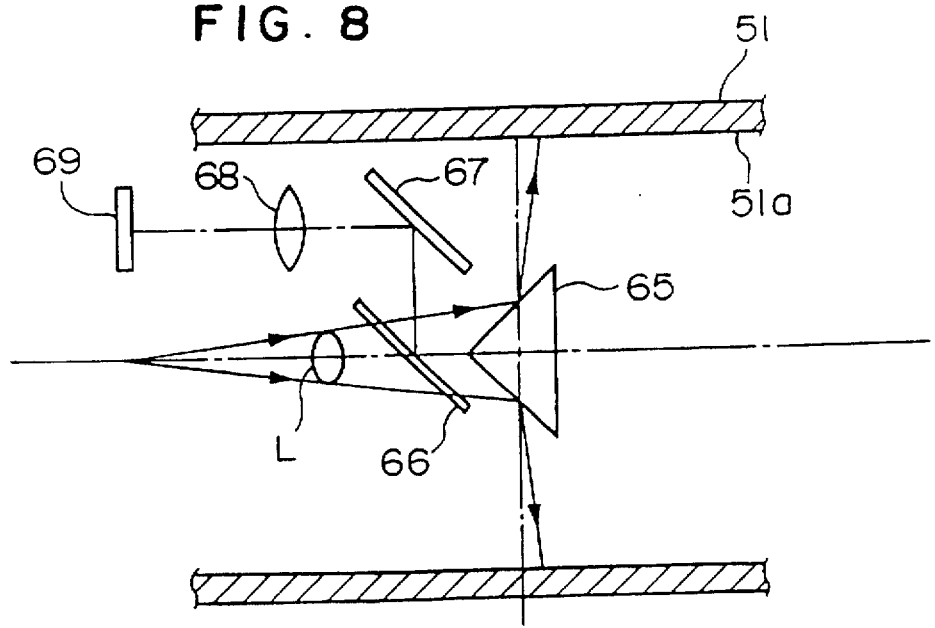
FIG. 8 is a diagrammatic view showing an example in which the inventive optical apparatus is applied to an apparatus for detecting a flaw or the like of an inner surface of a pipe.
Figure 9:
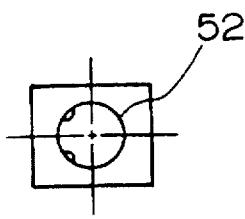
FIG. 9 is a diagrammatic view showing an example of a received image obtained from the measurement of the inner profile of the pipe.

FIG. 8 shows an example in which the inventive optical apparatus is applied to a light emitter of an apparatus for detecting a flaw or the like of an inner surface of a pipe. The optical apparatus which is capable of outputting the ring beam which gradually diverges along the optical axis as shown in FIG. 3 or 4 for example is used for the light emitter. This detector is arranged such that the ring beam L output from the emitter (not shown) is diverged in the direction almost vertical to the optical axis by a conical prism 65 and a reflected light beam of the diverged light reflected by an inner surface 51a of the pipe 51 is input to a condenser lens 68 to condense and to receive it by a light receiver 69. Because an optical axis of the light beam output from the emitter and an optical axis of the light beam input to the light receiver 69 are shifted from each other by a splitter plate 66 and a reflection mirror 67, an optical trigonometrical survey may be performed and a received light image 52 as shown in FIG. 9 for example may be obtained. This received light image 52 shows a sectional shape of the inner surface 51a of the pipe 51 at an arbitrary position. Accordingly, it becomes possible to inspect the inner profile of the pipe 51, to detect a flaw or the like of the inner surface 51a and to locate a center axis of the pipe 51 based on the continuous received light images obtained by scanning the irradiating position of the inner surface 51a of the pipe 51 in the axial direction.

Figure 10:
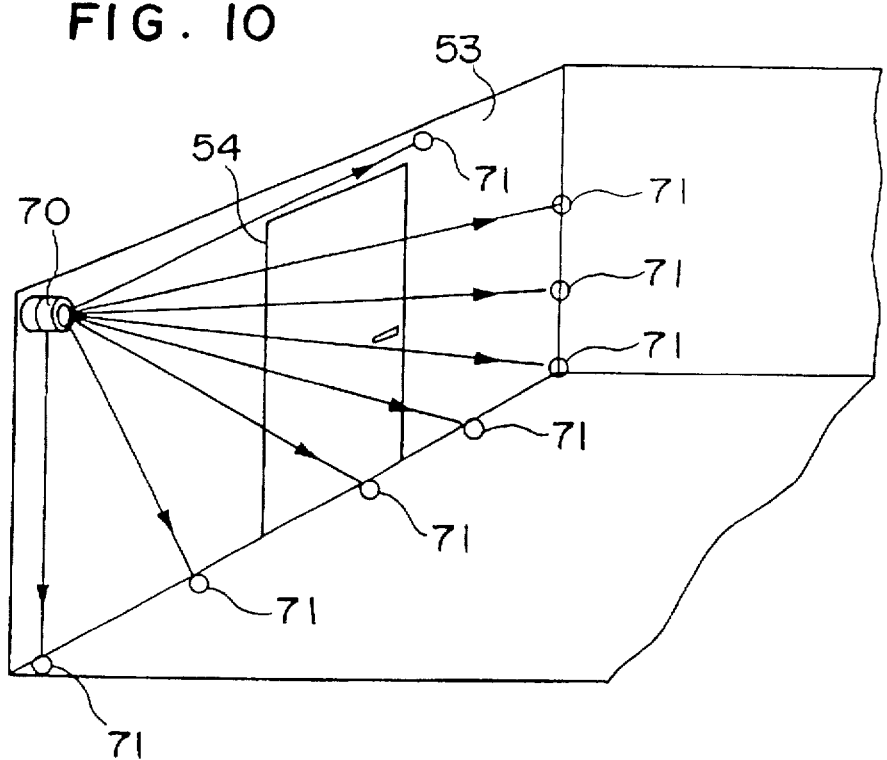
FIG. 10 is a diagrammatic view showing an example in which the inventive optical apparatus is applied to a burglar alarm system.

FIG. 10 shows an example in which the inventive optical apparatus is applied to a light emitter of a burglar sensor system. The optical apparatus which is capable of transforming the ring beam into the light beam which diverges in the direction vertical to the optical axis and of outputting it as shown in FIG. 1 or 2 for example is used for the light emitter. The light emitter 70 of the burglar sensor system is mounted at an upper part of a wall 53 or the like so that output light thereof covers the inner side of the wall 53, a door 54 and the like of a house for example. A plurality of light receivers 71 are disposed on a floor, ground or wall linearly along the wall 53 and door 54 for example. Thereby, the system equipped with the multi-direction burglar sensors may be obtained by using one light emitter 70 and the plurality of light receivers 71, 71, . . . .

Figure 11:
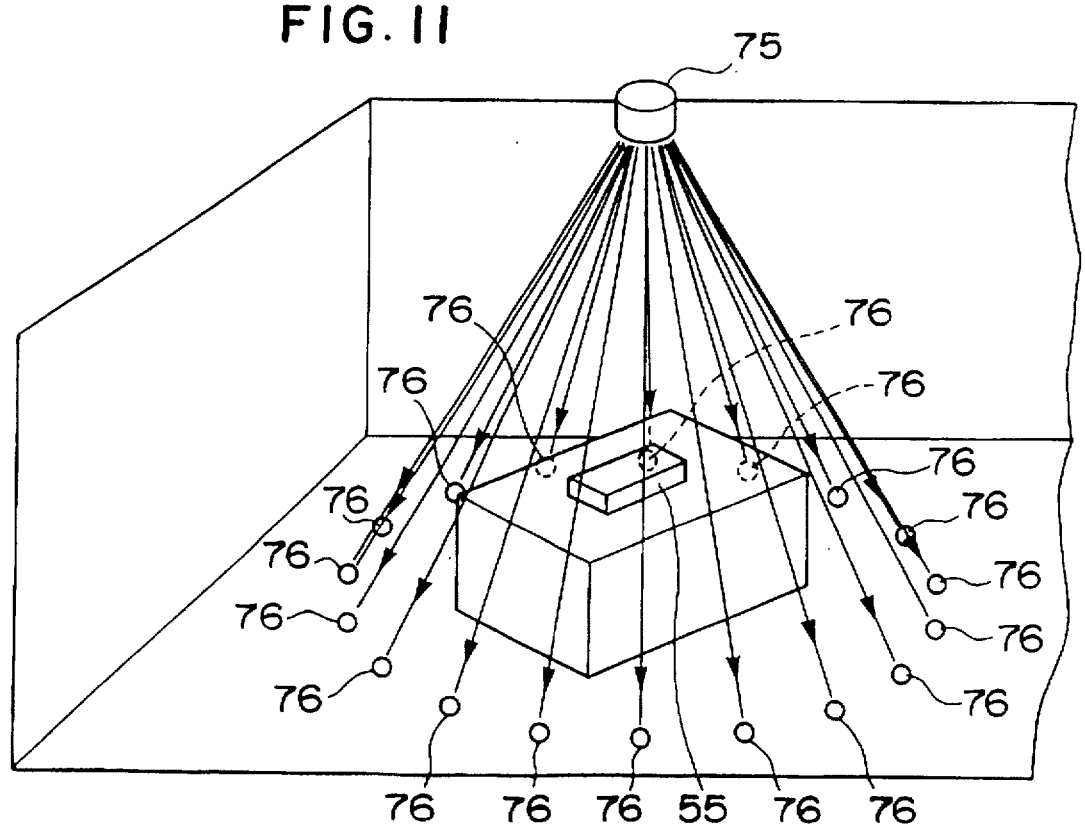
FIG. 11 is a diagrammatic view showing another example in which the inventive optical apparatus is applied to a burglar alarm system.

FIG. 11 shows an example in which the inventive optical apparatus is applied to a light emitter of a burglar sensor system. The optical apparatus which is capable of outputting the ring beam which gradually diverges along the optical axis as shown in FIG. 3 or 4 for example is used for the light emitter. The light emitter 75 of this burglar sensor system is mounted on a ceiling (not shown) so that output light thereof covers an exhibit 55 for example. A plurality of light receivers 76 are disposed on the floor around the exhibit 55. This embodiment also allows the system equipped with the multi-direction burglar sensors to be obtained by using one light emitter 75 and the plurality of light receivers 76, 76, . . .

Figure 12:
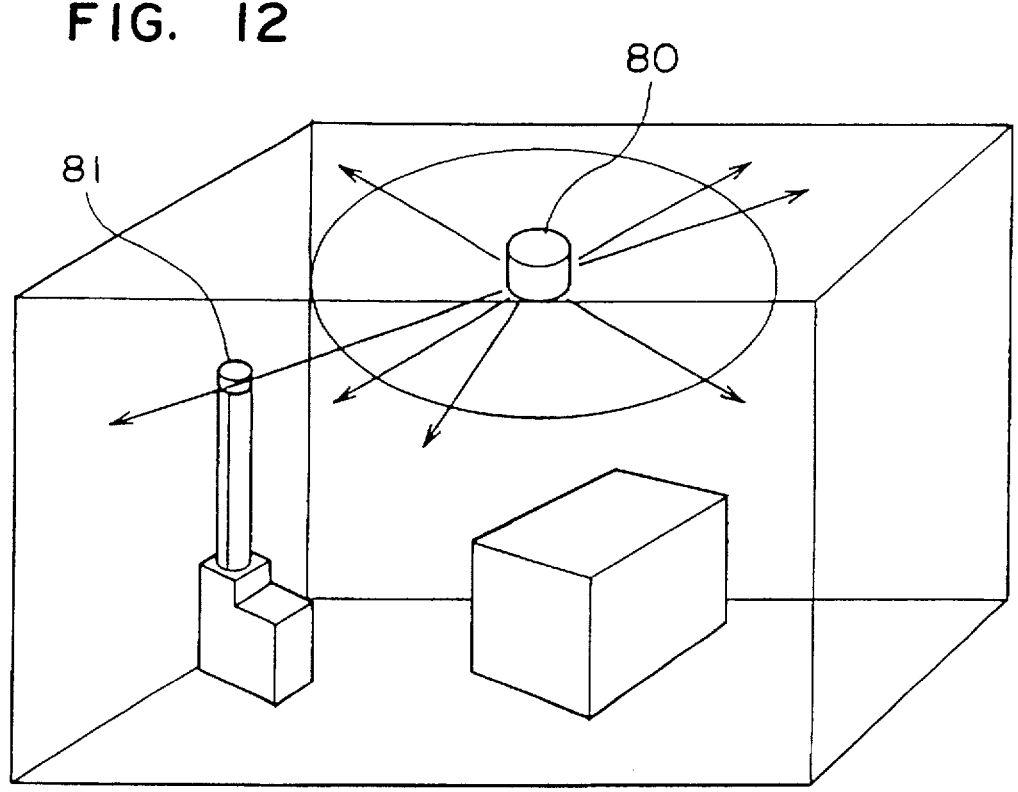
FIG. 12 is a diagrammatic view showing an example in which the inventive optical apparatus is applied to an optical LAN system.
Figure 13:
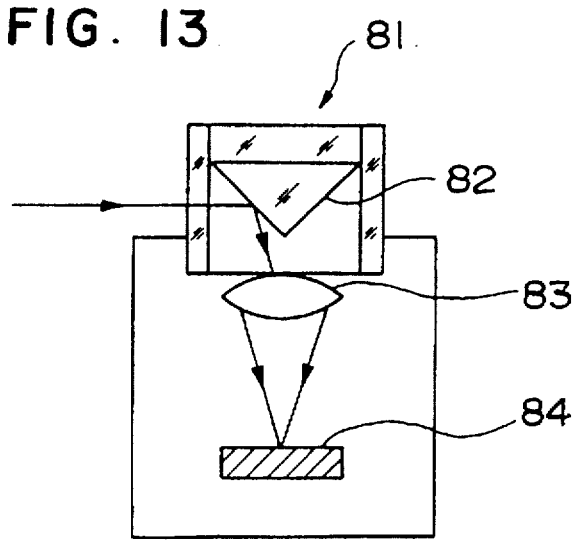
FIG. 13 is a diagrammatic view showing one example of a receiver of the optical LAN system.

FIG. 12 shows an example in which the inventive optical apparatus is applied to a light emitter of an optical LAN (Local Area Network) for use in an office, a factory and the like. The optical apparatus shown in FIG. 1 or 2 or that shown in FIG. 3 or 4 is used as the light emitter. The light emitter 80 of this optical LAN system is mounted on a ceiling (not shown) for example. A light receiver 81 is provided at a high position (preferable to be as high as possible) where a light beam output from the emitter 80 can be received. The receiver 81 is arranged such that the light beam input from the side thereof is reflected by an outer peripheral face of a conical prism 82 to input to a condenser lens 83 to condense and to receive it by a light receiving element 84 as shown in FIG. 13 for example.

Figure 14:
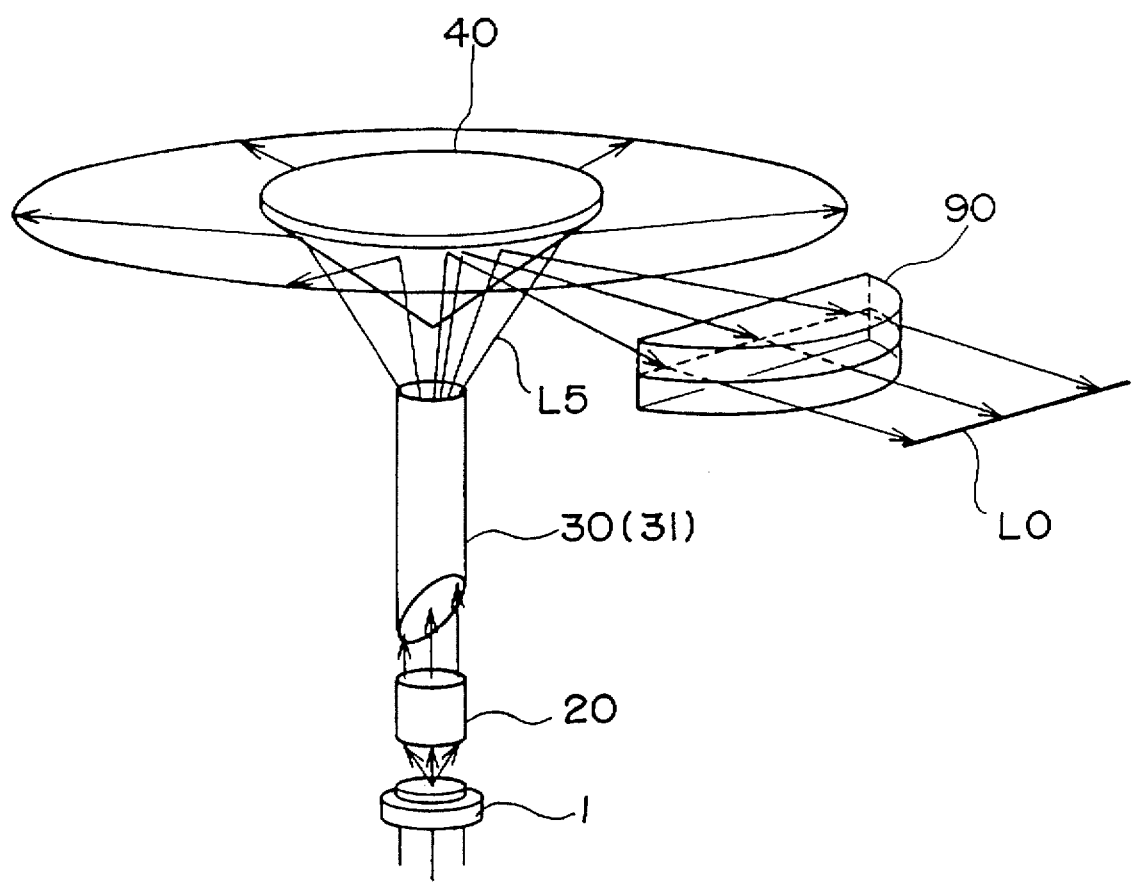
FIG. 14 is a diagrammatic view showing an example in which the inventive optical apparatus is applied to a light emitter for outputting a parallel slit beam.

FIG. 14 shows an example in which the inventive optical apparatus is applied to a light emitter for outputting a parallel light beam for use in a form detecting apparatus or the like. The optical apparatus shown in FIG. 1 for example is used as the light emitter. A part of the beam diverging vertically to the optical axis and in the direction of 360° is input to a cylindrical lens 90 to transform into and to output as a parallel light beam L0.

According to each embodiment described above, the narrow light beam may be output vertically to the optical axis A—A or with an arbitrary angle of divergence with respect to the optical axis and in the direction of 360° concurrently, so that no turning mechanism which has been used in the prior art needs to be provided, eliminating an effect of shakiness of the turning mechanism and the like caused by aged deterioration. Further, because an irradiated light may be measured concurrently by providing light receivers at a plurality of measuring points, respectively, when the irradiated light needs to be measured at a plurality of points like a level used in construction and civil engineering works, the measurement may be performed in higher precision. Still more, excellent effects may be obtained when the present invention is applied to an optical demultiplexer and an optical multiplexer in optical communications or to various sensors using optical sensors such as a burglar alarm sensor. Moreover, applying the present invention to the optical LAN system allows a number of light emitter to be reduced remarkably, so that it will bring about a large economical effect.

It is noted that the present invention is not confined only to each embodiment described above. Rather, it may be varied in various ways. For example, the light source 1 may be another laser source or an LED, instead of the semiconductor laser.

Further, the specifications of the optical fiber 30 and the cylindrical rod 31 are not confined only to those in the embodiments described above.

Further, the divergent angle changing means 4 may be an optical element other than the conical prism so long as it has the same function with the conical prisms 40 and 41 and the concave conical prism 42 described above.

Still more, the light beam output from the ring beam generating means 3 may be a light beam which constitutes a part of the ringed shape.

It is also needless to say that apparatuses to which the present invention may be suitably applied are not limited only to those exemplary applications described above.

What is claimed is:

1. An optical apparatus for controlling an angle of divergence of a ring beam, comprising:

parallel beam generating means for outputting a parallel light beam;

ring beam generating means having a light-entry end surface into which the parallel light beam from the parallel beam generating means is input and which is capable of converting the input light beam into a ring beam whose shape projected on an imaginary plane perpendicular to an optical axis of the input light beam is a ring or part of a ring and which diverges at a prescribed angle of divergence with respect to the optical axis; and divergent angle changing means for changing the angle of divergence of the ring beam to change an expansion ratio or a reduction ratio of the projected shape thereof in the course of ring beam travel as a function of distance from a light-exit face of the ring beam generating means from which the ring beam is output, the ring beam generating means being a step index optical fiber, the input light beam being a parallel light beam lying parallel to the optical axis and the light-entry end surface of the optical fiber being formed aslant with respect to the optical axis, and the input light beam entering the optical fiber being reflected R number of reflections within the optical fiber, R being a value of not less than four defined by:

$$R=1+(a-D \tan \theta/2 - D/2 \tan \{\theta-\arcsin (\sin \theta/n)\}) \times \tan \{\theta-\arcsin (\sin \theta/n)\}/D,$$

where D is the diameter, a is the length and n is the refractive index of the optical fiber, and $\theta$ is the incident angle of the parallel beam.

2. The optical apparatus for controlling an angle of divergence of a ring beam according to claim 1, wherein the divergent angle changing means has a conical reflecting surface capable of reflecting light or a conical transmitting surface capable of transmitting light, and the ring beam output from the ring beam generating means is input to the reflecting surface or the transmitting surface to avoid an apex portion of the conical reflecting surface or the conical transmitting surface.

3. The optical apparatus for controlling an angle of divergence of a ring beam according to claim 2, wherein an apex angle of the conical reflecting surface or the conical transmitting surface of the divergent angle changing means is of a magnitude enabling divergence of the ring beam input to the divergent angle changing means in a direction perpendicular to and centered on the optical axis of the input ring beam.

4. The optical apparatus for controlling an angle of divergence of a ring beam according to claim 1, wherein a laser beam source for emitting a laser beam is used as a light source for the parallel beam generating means.

5. An optical apparatus for controlling an angle of divergence of a ring beam, comprising:

parallel beam generating means for outputting a parallel light beam;

ring beam generating means having a light-entry end surface to which the parallel light beam from the parallel beam generating means is input and which is capable of converting the input light beam into a ring beam whose shape projected on an imaginary plane perpendicular to an optical axis of the input light beam is a ring or part of a ring and which diverges at a prescribed angle of divergence with respect to the optical axis; and divergent angle changing means for changing the angle of divergence of the ring beam to change an expansion ratio or a reduction ratio of the projected shape thereof in the course of ring beam travel as a function of distance from a light-exit face of the ring beam generating means from which the ring beam is output, the ring beam generating means being a cylindrical rod, the input light beam being a parallel light beam lying parallel to the optical axis and the light-entry end surface of the cylindrical rod being formed aslant with respect to the optical axis, and the input light beam entering the cylindrical rod being reflected R number of reflections within the cylindrical rod, R being a value of not less than four defined by:

$$R=1+(a-D \tan \theta/2 - D/2 \tan \{\theta-\arcsin (\sin \theta/n)\}) \times \tan \{\theta-\arcsin (\sin \theta/n)\}/D,$$

where D is the diameter, a is the length and n is the refractive index of the cylindrical rod, and $\theta$ is the incident angle of the parallel beam.

6. The optical apparatus for controlling an angle of divergence of a ring beam according to claim 5, wherein the divergent angle changing means has a conical reflecting surface capable of reflecting light or a conical transmitting surface capable of transmitting light, and the ring beam output from the ring beam generating means is input to the reflecting surface or the transmitting surface to avoid an apex portion of the conical reflecting surface or the conical transmitting surface.

7. The optical apparatus for controlling an angle of divergence of a ring beam according to claim 6, wherein an apex angle of the conical reflecting surface or the conical transmitting surface of the divergent angle changing means is of a magnitude enabling divergence of the ring beam input to the divergent angle changing means in a direction perpendicular to and centered on the optical axis of the input ring beam.

8. The optical apparatus for controlling an angle of divergence of a ring beam according to claim 5, wherein a laser beam source for emitting a laser beam is used as a light source for the parallel beam generating means.

\* \* \* \* \*